United States Patent Office 3,407,843
Patented Oct. 29, 1968

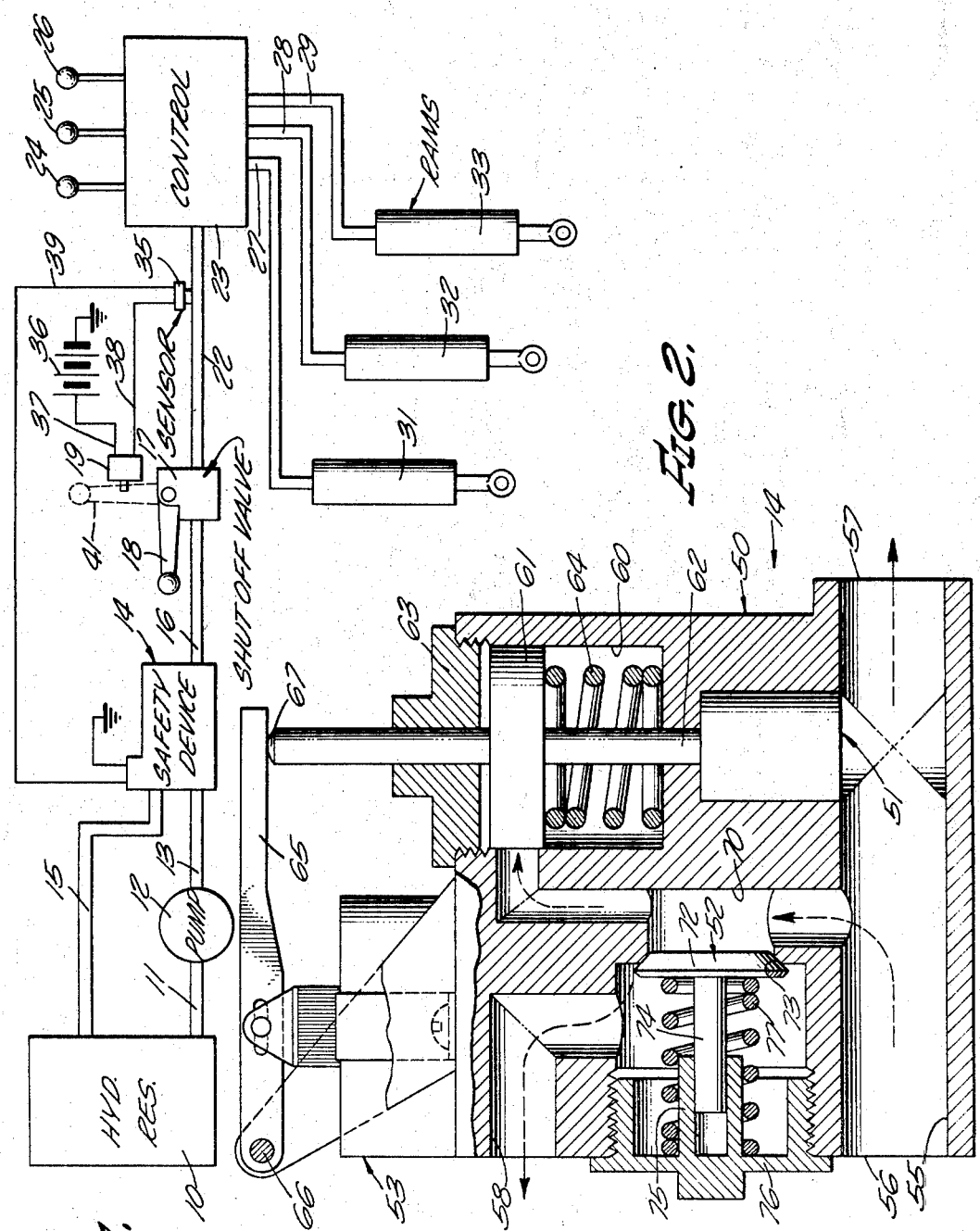

3,407,843
HYDRAULIC SAFETY SYSTEM AND DEVICE
Gerald Walter Dandridge, West Los Angeles, Calif., assignor, by mesne assignments, to Beatrice Foods Co., Chicago, Ill., a corporation of Delaware
Filed June 27, 1966, Ser. No. 560,427
7 Claims. (Cl. 137—563)

This invention relates to a hydraulic system and safety valve and more particularly to such a system and valve for preventing the loss of hydraulic fluid from the system in the event of a major leak or line break in the hydraulic system.

Many hydraulic systems are in use for driving hydraulic rams, hydraulic motors, and the like. The typical system includes a reservoir for hydraulic fluid, and a pump coupled with the reservoir to supply hydraulic fluid under pressure to the hydraulic equipment. The system usually includes one or more shutoff or control valves, as well as some type of pressure relief valve which operates to return hydraulic fluid to the reservoir upon the occurrence of excessive pressures. Such hydraulic systems are used in many applications, both fixed and portable. Typical examples are in fork lift trucks, bulldozers, cotton gins, and so forth. Inasmuch as major leaks or breaks occur in such systems, a substantial loss of hydraulic fluid usually results before the system can be shut down. Such leaks or breaks occur in various parts of the system including flexible hoses and couplings employed therein. Also, such leaks or breaks may occur in some part of the system which is difficult or impossible to isolate by the usual shutoff valves. Not only is the loss of fluid itself expensive, but the attendant possibility of fire and other hazards resulting therefrom cause a significant danger to equipment or operating personnel.

Some types of hydraulic safety valves and check valves have been devised for restricting or closing a line or the like in the event of certain occurrences. For example, United States Patent No. 2,381,447 discloses a check valve which closes a line in the event of a sudden drop in pressure. In this system, a pressure differential is sensed in a rather complex manner to effect operation of the check valve. Other patents teach the use of valves in fluid lines which are operated in response to a supply pressure level. For example, United States Patents Nos. 1,055,803 and 1,904,475 disclose valves which operate in response to a predetermined change in fluid supply pressure thereto.

Such valves known in the prior art are not readily adaptable for sensing major leaks or breaks in a hydraulic system because of numerous factors. Such valves are relatively complex in their construction, and frequently are bulky and expensive as well as insufficiently fast in their response to prevent a significant loss of hydraulic fluid. In a typical hydraulic system, the flow rate may be twenty-five to fifty gallons per minute, and inasmuch as the system utilizes approximately twenty-five gallons of hydraulic fluid the entire volume may be lost in one-half to one minute. Likewise, a substantial volume of fluid may be lost in only several seconds.

Accordingly, it is an object of the present invention to provide an improved fluid handling system in which a predetermined sudden loss of pressure causes at least a portion of the system to shut down to prevent the loss of fluid from the system.

An additional object of this invention is to provide an improved hydraulic system which operates in response to a predetermined pressure decrease to seal at least a portion of the system to thereby prevent fluid loss therefrom.

Accordingly, it is an object of the present invention to provide an improved hydraulic system in which a predetermined sudden loss of pressure causes at least a portion of the system to shut down to prevent the loss of fluid from the system.

Another object of this invention is to provide an improved safety valve which is operated in response to a predetermined condition.

A further object of this invention is to provide an improved hydraulic safety valve of relatively simple construction and which operates in response to a predetermined condition to divert a stream of fluid.

These and other objects of this invention will become more apparent upon a consideration of the following description taken in conjunction with the drawing in which:

FIGURE 1 illustrates a hydraulic system constructed in accordance with the teachings of the present invention; and FIGURE 2 is a cross-sectional view of a hydraulic valve for use in a system of the nature shown in FIGURE 1.

Referring now to the drawings, FIGURE 1 illustrates a hydraulic system including a hydraulic reservoir 10 which contains a suitable volume of hydraulic fluid, and which is coupled through a line 11 to a hydraulic pump 12. The outlet of the hydraulic pump 12 is coupled through a line 13 to a hydraulic safety device 14 which is shown in greater detail in FIGURE 2 and which will be further discussed subsequently. A return line 15 is coupled from the hydraulic safety device back to the reservoir 10, and an outlet line 16 is coupled from the device 14 to a manually controlled shutoff valve 17. The shutoff valve 17 includes an operating lever 18 which, when moved to fully open the valve 17, closes a switch 19.

The shutoff valve 17 is coupled through a line 22 to a conventional hydraulic control box 23 which includes a plurality of hydraulic control valves. For example, the control box 23 may include three control valves operated by levers 24 through 26 to control the fluid flow to respective hydraulic lines 27 through 29. The lines 27 through 29 may be coupled to operate respective hydraulic rams 31 through 33 or other hydraulic equipment.

A pressure sensor 35 is coupled in the line 22. This sensor is a simple conventional diaphragm type switch which operates to close a pair of electrical contacts upon a predetermined reduction of pressure in the line 22. The contacts of the sensor 35 are coupled in series with a voltage source 36, the switch 19 and the hydraulic safety device 14. Thus, one terminal of the voltage source 36 is grounded, and the other terminal thereof is coupled through a line 37 to one terminal of the switch 19, with the other terminal of the switch 19 being coupled through a line 38 to one of the terminals of the sensor 35. The remaining terminal of the sensor 35 is coupled through a line 39 to the hydraulic safety device 14. The device 14 includes a solenoid to which the line 39 is connected, the other terminal of the solenoid being connected to the ground.

Upon energization of the hydraulic pump 12, hydraulic fluid pressure in the system increases. With the valve 17 closed, fluid is returned to the reservoir 10 through the hydraulic safety device 14 and the return line 15. The control handle 18 is operated to the phantom line position illustrated by reference numeral 41 to open the valve 17. When the valve 17 becomes fully opened, the lever 18 engages the switch 19 thereby causing its contacts to close. This completes the electrical circuit from the voltage source 36 to the sensor 35. Inasmuch as the contacts of the switch 19 are not closed until the valve 17 is fully opened and the hydraulic pressure in the line 22 has increased to an operating level, the contacts of the sensor 35 are open at this time. Accordingly, no current is supplied to the solenoid in the hydraulic safety device 14. If a major leak or break occurs in the hydraulic system in the vicinity of or to the right of the sensor 35, its contacts close thereby supplying current to the solenoid in the hydraulic safety device 14. This causes a diversion of hydraulic fluid back to the reservoir through the return line 15 and a termination of fluid flow through the device 14 to the remainder of the hydraulic system as will now be described. It will be apparent that the sensor may be used anywhere in the system downstream of the safety device 14.

The hydraulic safety device 14 is shown in greater detail in FIGURE 2 and includes a valve body 50, a restrictor or plug 51, a pressure relief valve 52 and a solenoid 53. The valve body 50 includes a passageway 55 through which hydraulic fluid normally passes from the pump 12 to the shutoff valve 17, and has an inlet end 56 and an outlet end 57 respectively adapted to be coupled with lines 13 and 16. A return port 58 is adapted to be coupled to the return line 15. Normally, fluid flows through the passageway 55 except when an excess of pressure occurs, in which event the fluid is returned through the pressure relief valve 52, the port 58 and the return line 15 to the reservoir 10.

The body 50 includes a cylindrical chamber 60 having a piston 61 therein. An actuator rod 62 is firmly affixed to the plug 51 and the piston 61, and extends through an orifice in a cap 63. A spring 64 is arranged within the chamber 60 to normally bias the plug 51 and piston 61 upwardly. The solenoid 53 includes an actuator lever 65 pivoted at 66 and engaging the upper end 67 of the rod 62. Upon energization of the solenoid 53, the actuator 65 moves clockwise thereby forcing the rod 62 downwardly. This causes the plug 61 to move into and close the passageway 55 to thereby terminate fluid flow therethrough. It will be appreciated that the plug 51 can take any of numerous shapes for positively sealing the chamber 55. For example, the chamber 55 in the vicinity of the plug 51 may have a suitable vertical cross-sectional shape, such as cylindrical, to allow the plug 51 to freely move into the chamber to terminate fluid flow therethrough.

As the plug 51 is moved downwardly by the action of the solenoid 53, fluid commences to flow into a passageway 70 within the body 50 and to the upper end of the chamber 60 thereby exerting a downward force on the piston 61. Normally, communication between the passageway 70 and the chamber 60 is prevented by the periphery of the piston 61. The action of the fluid pressure against the piston 61 aids in quickly causing the plug 51 to close the passageway 55. Additionally, as the plug 51 approaches the lower wall of the passageway 55, a venturi action occurs causing a slight pressure drop between the bottom of the plug 51 and bottom wall of the passageway 55 adjacent thereto to further aid in the closing action.

When the pressure in the passageways 55 and 70 increases sufficiently, the pressure relief valve 52 opens thereby allowing the fluid to return to the hydraulic reservoir. The pressure relief valve 52 includes a valve member 72 having a chamfered surface which normally engages a mating surface 73 within the body 50. A valve stem 74 is coupled with the valve member 72 and extends into a projection 75 having a bore therein acting as a bushing in a cap 76. A spring 77 is provided between the cap 76 and the valve member 72 to normally maintain the pressure relief valve closed. Thus, upon an increase of pressure within the passageway 70, the pressure relief valve 52 opens with the valve member 72 moving to the left as shown in FIGURE 2. This operation allows hydraulic fluid to flow from the passageway 70 to the port 58 thereby allowing fluid from the pump 12 in FIGURE 1 to return through the return line 17 to the reservoir 10. This operation occurs either when the pressure downstream of the hydraulic safety device shown in FIGURE 2 increases sufficiently high, or the pressure within the passageways 55 and 70 increases as a result of the closing of the plug 51. The hydraulic safety device is quick acting in response to a substantial downstream drop in pressure and prevents not only the waste of fluid occasioned thereby but also the potential dangers of major leaks or system breaks. Inasmuch as the safety device 14 will become hydraulically locked when the plug 51 closes the passageway 55, a bleed valve (not shown) is provided in an appropriate location to enable the device 14 to be reset after the system has been repaired. A bleed valve may be included, for example, in the line 13 or through the wall of the passageway 55 to the left of the plug 51.

It will be apparent that the present invention relates to an improved fluid flow system and safety valve for use therein to prevent fluid loss upon the occurrence of a predetermined pressure condition. It will be appreciated that the concepts of the present invention are applicable to other fluid flow systems in which major leaks or breaks may occur thereby resulting in loss of relatively expensive or dangerous fluids, such as acids. Accordingly, the present embodiments of the invention are to be considered in all respects as illustrative and not restrictive, the scope thereof being indicated by the appended claims rather than by the foregoing description, and all changes which come within the meaning and range of equivalency of the claims therefore are intended to be embraced therein.

What is claimed is:

1. A fluid handling system comprising
    a fluid reservoir,
    a fluid pump connected with said reservoir to supply fluid under pressure,
    a valve body having an inlet and a first outlet and a first passageway therethrough communicating between said inlet and said outlet, said inlet being coupled with said fluid pump and said outlet being coupled with an outlet line for supplying fluid to fluid receiving equipment, and a second passageway communicating between said first passageway and a chamber within said body,
    valve means mounted in said valve body and including plug means for restricting fluid flow through said first passageway when said valve means is closed, said valve means including piston means mounted within said chamber and coupled with said plug means for movement together, said valve means being normally maintained in an open position with said piston means preventing fluid communication between said second passageway and said chamber and said plug means allowing fluid flow through said first passageway, and said piston means allowing communication between said second passageway and said chamber as said first valve means closes thereby enabling fluid flow through said first and second passageways to act on said piston means to aid in closing said first valve means,
    sensor means coupled in said outlet line to sense a predetermined pressure decrease therein,
    electrical actuator means coupled with and responsive to said sensor means to cause said valve means to close in response to said pressure decrease in said outlet line, and
    relief means coupled between said pump and said reservoir to return fluid to said reservoir upon a predetermined increase in fluid pressure in said outlet line.

2. A fluid handling system as in claim 1 wherein said relief means is provided within said valve body.

3. A fluid handling system as in claim 2 wherein said sensor means includes an electrical switch which is operated in response to said pressure decrease in said outlet line, and
    said actuator means includes an electrical solenoid and a source of electrical power, and is responsive to operation of said switch to move said plug means into said first passageway thereby closing said valve means.

4. A hydraulic system comprising
   a hydraulic reservoir,
   a hydraulic fluid pump connected with said reservoir to supply hydraulic fluid under pressure,
   a valve body having an inlet and a first outlet and a first passageway therethrough communicating between said inlet and said outlet, said inlet being coupled with said fluid pump and said outlet being coupled with an outlet line for supplying hydraulic fluid to hydraulic equipment, said valve body including a second outlet coupled with said reservoir to return fluid thereto, said second outlet communicating with a port in said body, and a second passageway communicating between said first passageway and a chamber within said body,
   first valve means mounted in said valve body and including plug means for restricting hydraulic fluid flow through said first passageway when said valve means is closed, said valve means including piston means mounted within said chamber and coupled with said plug means for movement together, said piston means normally preventing fluid communication between said second passageway and said chamber and said piston means allowing communication between said second passageway and said chamber as said first valve means closes thereby enabling fluid flow through said first and second passageways to act on said piston means to aid in closing said first valve means,
   sensor means coupled in said outlet line to sense a predetermined hydraulic pressure therein,
   actuator means coupled with and responsive to said sensor means to cause said first valve means to close in response to a predetermined hydraulic pressure in said outlet line, and
   second valve means mounted in said body for allowing communication between said first passageway and said port upon a predetermined increase in pressure in said outlet line.

5. A hydraulic system as in claim 4 wherein
   said sensor means includes an electrical switch which is operated in response to a predetermined hydraulic pressure decrease in said outlet line, and
   said actuator means includes an electrical actuator responsive to operation of said switch to cause said first valve means to close.

6. A safety valve for use in fluid handling systems for restricting fluid flow to associated equipment in the event of a predetermined fluid pressure decrease in at least a portion of said system comprising
   a valve body having an inlet for receiving fluid under pressure, a first outlet for supplying said fluid through an outlet line to fluid receiving equipment and a first passageway therethrough communicating between said inlet and said outlet, said valve body including a second outlet communicating with a port in said body, and a second passageway communicating between said first passageway and a chamber within said body,
   safety valve means mounted in said valve body and including plug means for restricting fluid flow through said first passageway when said safety means is closed, said safety valve means including piston means mounted within said chamber and coupled with said plug means for movement together, said valve means normally being biased in an open position with said piston means normally preventing fluid communication between said second passageway and said chamber and said plug means allowing fluid flow through said first passageway, and said piston means allowing communication between said second passageway and said chamber as said first valve means closes thereby enabling fluid flow through said first and second passageways to exert pressure on said piston means to aid in closing said safety valve means,
   solenoid actuator means coupled with said valve body for moving said piston means and said plug means to close said safety valve means in response to said predetermined fluid pressure decrease, and
   second valve means mounted in said body for allowing communication between said first passageway and said port upon a predetermined increase in fluid pressure in said first passageway.

7. A safety valve as in claim 6 wherein
   said plug means is coupled by a rod with said piston means, said rod extending from said valve body and being engaged by an arm member of said actuator means to close said safety valve means in response to said predetermined fluid pressure decrease.

References Cited
UNITED STATES PATENTS

| | | | |
|---|---|---|---|
| 910,939 | 1/1909 | Miller et al. | 137—466 |
| 2,557,333 | 6/1951 | Zwack | 137—563 |
| 2,833,374 | 5/1958 | Glassel | 137—563 |
| 3,171,432 | 3/1965 | Bard. | |

M. CARY NELSON, *Primary Examiner.*

WILLIAM R. CLINE, *Assistant Examiner.*